United States Patent [19]
Naete et al.

[11] Patent Number: 4,560,885
[45] Date of Patent: Dec. 24, 1985

[54] STEERING WHEEL SWITCHING CIRCUIT

[75] Inventors: Hidehiko Naete, Yokohama; Chihiro Funaoka, Tokyo, both of Japan; Daniel Augello, La Celle Saint Cloud; Jean-Claude Coste, Marly-le-Roi, both of France

[73] Assignees: Stanley Electric Co. Ltd., Tokyo, Japan; Regie Nationale des Usines Renault, Boulogne-Billancourt, France

[21] Appl. No.: 517,954

[22] Filed: Jul. 28, 1983

[30] Foreign Application Priority Data

Jul. 28, 1982 [JP] Japan ............................. 57-130542

[51] Int. Cl.⁴ .............................................. H04Q 1/24
[52] U.S. Cl. ................................. 307/10 R; 307/115; 307/140
[58] Field of Search ............... 307/9, 10 R, 113, 115, 307/140

[56] References Cited
PUBLICATIONS

IBM Technical Disclosure Bulletin, vol. 12, No. 6 (Nov. 1969), T. E. Dooley et al., "Dual Control Circuit".

*Primary Examiner*—A. D. Pellinen
*Assistant Examiner*—Derek S. Jennings
*Attorney, Agent, or Firm*—Oblon, Fisher, Spivak, McClelland & Maier

[57] ABSTRACT

A steering wheel switching circuit is provided which is capable of controlling component parts on a car body side through the use of a small quantity of coupling devices in cooperation with a controlling part by connecting a switching part installed on the steering wheel and two sets of series circuits installed on the car body part in parallel with a power supply. The switching portion includes a switch circuit having diodes electrically short-circuited across two terminals in both the positive and the negative direction. These two sets of series circuits have load resistances and switching elements with control terminals with the controlling part applying opposite polarity signals to the control terminals of the switching elements.

3 Claims, 4 Drawing Figures

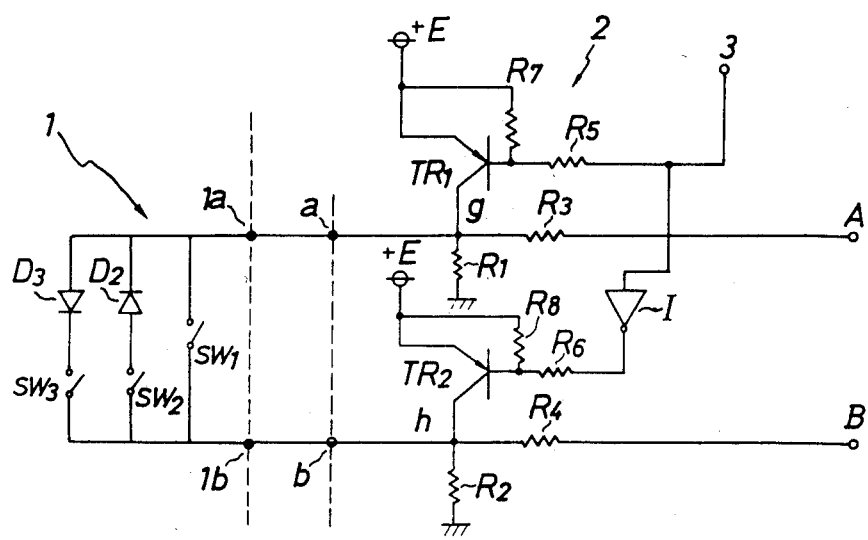
FIG_1
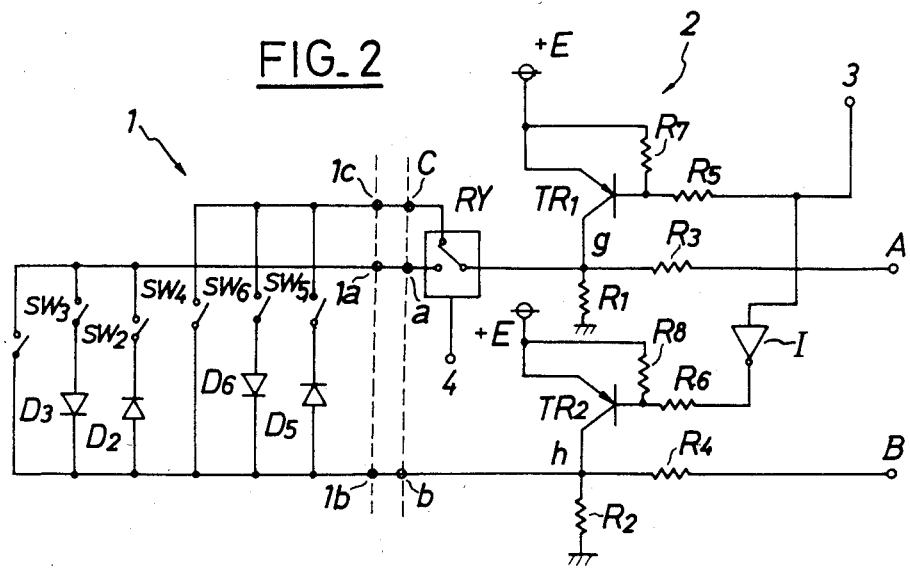
FIG_2

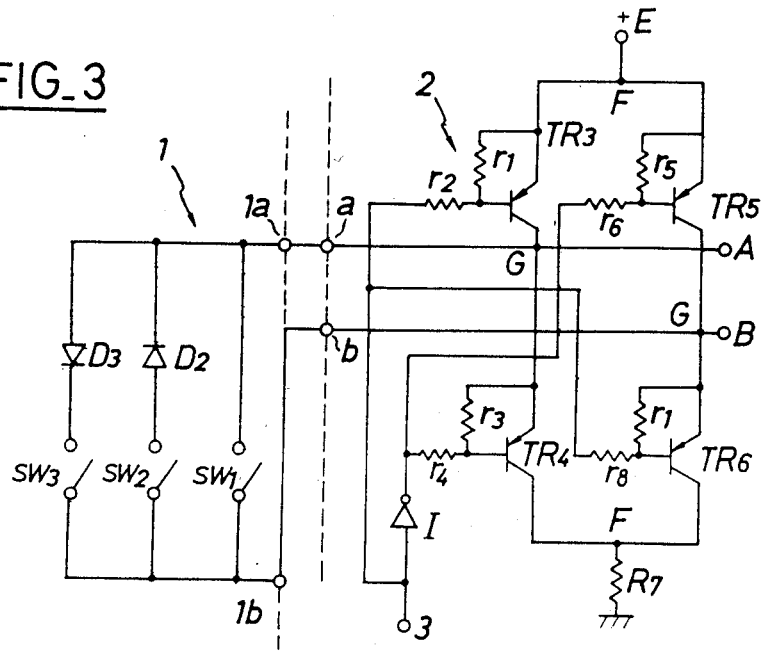
FIG_3
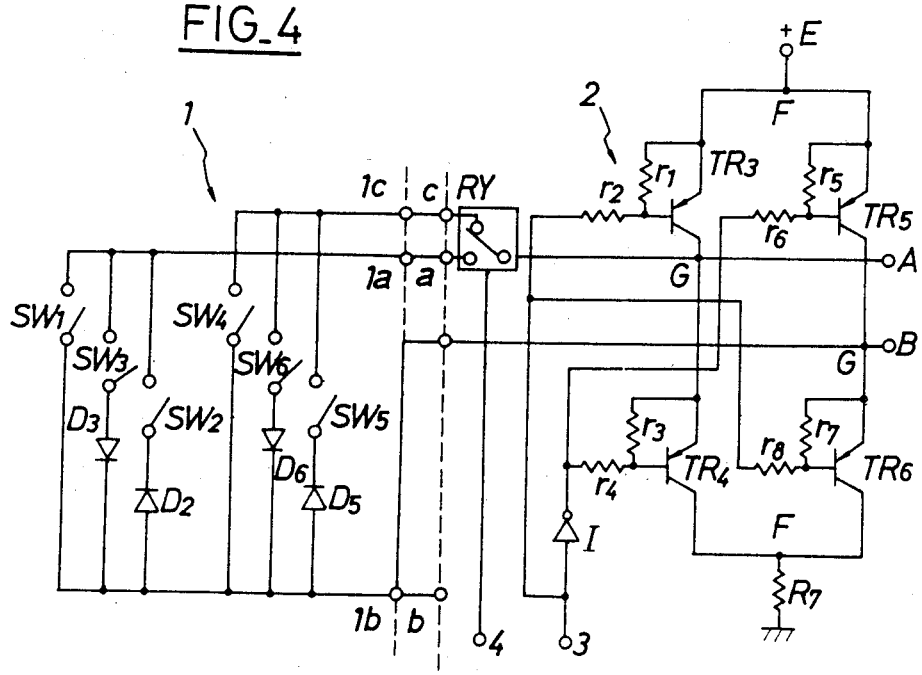
FIG_4

STEERING WHEEL SWITCHING CIRCUIT

BACKGROUND OF THE INVENTION

1. Field of the Invention

This invention relates to a steering wheel switching circuit for a plurality of switches installed on a steering wheel for the purpose of controlling component parts, such as electrical equipment and the like, of automobile and the like installed on a car body side.

2. Description of the Prior Art

Recent advancements automotive electronics have made it possible and necessary to perform various controls by operating switches at any position or positions of steering wheel.

This resulted in the installation of many switches on the steering wheel, causing problems in terms of durability, stability of contacting parts, etc. because of the complicated construction of the coupling parts connecting the steering wheel, which is a movable part, with the fixed part of the car body. In the case of flexible cable connection at the coupling part instead of using a contacting system, many switches installed at the steering wheel result in making the cable lose its flexibility because of a number of cable conductors required. The above not only has a detrimental effect on the operation of the steering wheel, but also causes a danger of accidents resulting from breaking-off of wires. In other words, the use of flexible wire referred to above has the defect of requiring much time and labor for wiring, checking, repairing. Accordingly, whether the coupling parts are of the contacting system type or of the cable system type, it is desirable to reduce the number of coupling parts as much as possible in order to connect the switching part on the steering wheel side with the car body side.

To attain the above purpose, there have conventionally been many proposals, which, however, are not put into practical use because of expensive costs, complicated construction, and a possibility of false function due to delicate construction which may be influenced by noise, temperature and other factors.

SUMMARY OF THE INVENTION

It is an object of this invention to provide a steering wheel switching circuit making it possible to operate many component parts on a car body side such as a constant speed running gear, variable setting speed alarm, radio, etc. by connecting control instructions from many switches installed on a steering wheel to fixed parts on a car body side through small quantities of coupling parts.

More specifically, the object of this invention is to provide a steering wheel switching circuit capable of controlling component parts on a car body side through the use of a small quanity of coupling parts in cooperation with a controlling part by connecting a switching part installed on the steering wheel and two sets of series circuit installed on the car body part in parallel with power supplies. The switching part includes a switch circuit including diodes electrically short-circuiting across two terminals in both the positive direction and the reverse direction. These two sets of series circuit comprise load resistances and switching elements having control terminals, and the controlling part applies opposite polarity control signals to the control terminals of the switching elements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1, shows a first embodiment of a steering wheel switching circuit according to the present invention;

FIG. 2, is a circuit diagram of a alternate embodiment of the switching circuit of FIG. 1;

FIG. 3, is a circuit diagram of another embodiment of the present invention; and FIG. 4, is a diagram of yet another embodiment of the switching circuit.

DETAILED DESCRIPTION OF THE PREFERRED EMBODIMENTS

Referring to FIG. 1, a switching part 1 is constructed by three circuits which are connected in parallel between its output terminals consisting of 2 terminals 1a and 1b, one circuit being a contact circuit of switch $SW_1$; another circuit being a series circuit comprising a diode $D_2$ connected in one direction and a contact circuit of $SW_2$, and the other circuit being a series circuit comprising a diode $D_3$, which is connected in a direction opposite to the diode $D_2$, and a contact circuit of switch $SW_3$. The switching part 1 is installed at a suitable position on a steering wheel (not shown) and is connected from said two terminals 1a and 1b to coupling parts a and b on the side of a car body (not shown). The coupling parts a and b may be of the construction including sliding parts or may be terminals for connecting flexible cables. In either case, the coupling parts serve to connect between movable parts from the steering wheel and fixed parts on the car body side.

Installed at a suitable position on the car body side is a controlling part 2, which selects any source of ON-OFF instructions sent by switches $SW_1$, $SW_2$ and $SW_3$ and applies control signals from its output terminals A and B to each component part (not shown) to be controlled.

In FIG. 1, PNP transistors $TR_1$ and $TR_2$ are used as the switching elements having control terminals in the controlling part 2.

Namely, a series circuit comprising the transistor $TR_1$ and a load resistance $R_1$ which is a current control resistance and another series circuit comprising the transistor $TR_2$ and another load resistance $R_2$ are connected in parallel between each + side and each − side of power supplies E in a direction permitting current to flow, with both load resistances, $R_1$ and $R_2$ being installed on each − side. And, a collector of the transistor $TR_1$ is grounded through the load resistance $R_1$, while a collector of the transistor $TR_2$ is grounded through the load resistance $R_2$. And further, a connecting point g of the collector of the transistor $TR_1$ and the load resistance $R_1$ is connected to the control output terminal A through the coupling part a and a resistance $R_3$. Likewise, a connecting point h of the collector of the transistor $TR_2$ and the load resistance $R_2$ is connected to the control output terminal B through the coupling part b and a resistance $R_4$.

A base of the transistor $TR_1$ is connected to a control signal input terminal 3 through a resistance $R_5$, while a base of the transistor $TR_2$ is connected to the control signal input terminal 3 through a series circuit of a resistance $R_6$ and an inverter I. The resistances $R_3$, $R_4$, $R_5$ and $R_6$ are current limiting resistances for preventing excess current, while resistances $R_7$ and $R_8$ are bias resistances for the transistors $TR_1$ and $TR_2$.

Next, description is made hereinafter on the operation of the steering wheel switching circuit, the construction of which was given above.

Firstly, description is made on the case where all the switches $SW_1$, $SW_2$ and $SW_3$ are set to OFF. When the control signal input terminal 3 has the input of high level 1 (hereinafter referred to as 1) signal, the transistor $TR_1$ is set to OFF because its base is of 1, while the transistor $TR_2$ is set to ON because its base is of low level (hereinafter referred to as 0) with the inversion by the inverter I, and the control output terminal A is of 0 because all the switches $SW_1$, $SW_2$ and $SW_3$ are set to OFF, and also the control output terminal B is of 1 with the transistor $TR_2$ being set to ON. When the control signal input terminal 3 has the input of 0 signal, contrary to the above the control output terminal A is of 1 with the transistor $TR_1$ being set to ON and the control output terminal B is of 0 with the transistor $TR_2$ being set to OFF.

Secondly, description is made on the case where only the switch $SW_1$ is set to ON. When the control signal input terminal 3 has the input of 1 signal, as stated above the transistor $TR_1$ is set to OFF and the transistor $TR_2$ is set to ON, but both control output terminals A and B become 1, with the coupling parts a and b being short-circuited electrically in both directions by the action of $SW_1$. And also, when the control signal input terminal 3 has the input of 0 signal, both control output terminals A and B become 1 because the switch $SW_1$ is set to ON.

Thirdly, description is made on the case where only the switch $SW_2$ is set to ON. When the control signal input terminal 3 has the input of 1 signal, the transistor $TR_1$ is set to OFF and the transistor $TR_2$ is set to ON, but both control output terminals A and B becomes 1 because the diode $D_2$ causes current to flow from the coupling part b to the coupling part a. When the control signal input terminal 3 has the input of 0 signal, the transistor $TR_1$ is set to ON and the transistor $TR_2$ is set to OFF, but the control output terminal A becomes 1 and the control output terminal B becomes 0 because the diode $D_2$ does not cause current to flow from the coupling part a to the coupling part b.

Fourthly, description is made on the case where only the switch $SW_3$ is set to ON. With the same operation as stated above, when the control signal input terminal 3 has the input of 1 signal, the control output terminal A becomes 0 and the control output terminal B becomes 1. When the control signal input terminal 3 has the input of 0 signal, both control output terminals A and B become 1.

Table 1 given below shows the relations between ON and OFF conditions of each switch $SW_1$, $SW_2$ and $SW_3$, and levels at the control signal input terminal 3, the control output terminal A and the control output terminal B of the controlling part 2 according to the description referred to above.

TABLE 1

| Switches | Control Signal Input Terminal ③ | Control Output Terminal Ⓐ | Control Output Terminal Ⓑ |
|---|---|---|---|
| All the switches OFF | 1 | 0 | 1 |
|  | 0 | 1 | 0 |
| Only the $SW_1$ ON | 1 | 1 | 1 |
|  | 0 | 1 | 1 |
| Only the $SW_2$ ON | 1 | 1 | 1 |
|  | 0 | 1 | 0 |
| Only the $SW_3$ ON | 1 | 0 | 1 |
|  | 0 | 1 | 1 |

As is clearly understood from Table 1, by changing the level at the control signal input terminal 3 it is possible to obtain the level combinations different each another, depending upon the operational conditions of the switches; i.e. the first condition under which all the switches, $SW_1$, $SW_2$ and $SW_3$ are set to OFF, the second condition under which only the switch $SW_1$ is set to ON, the third condition under which only the switch $SW_2$ is set to ON, and the fourth condition under which only the switch $SW_3$ is set to ON. Accordingly, combinations of high or low level at the control signal input terminal 3 with the levels at the control output terminals A and B make it possible to control the component parts on a car body side by the number of switches corresponding to the operational conditions, ON and OFF, of switches $SW_1$, $SW_2$ and $SW_3$.

With reference to the above description, when three switches are installed on a steering wheel, instruction signals from each switch can be applied through two coupling parts to a car body side. Accordingly, it is understood that two electric wires are available for connecting between the steering wheel side and the car body side.

Next, description is made hereinafter on another embodiment, in which six switches are installed on the steering wheel, with reference to FIG. 2 in which the same parts as those shown in FIG. 1 are expressed by using the corresponding same numbers and symbols.

As compared with FIG. 1, in FIG. 2, in addition to the switches $SW_1$, $SW_2$ and $SW_3$, and the diodes $D_2$ and $D_3$, switches $SW_4$, $SW_5$ and $SW_6$, and diodes $D_5$ and $D_6$, which are connected in the same way as said switches and said diodes, are installed on the switching part 1. Outputs from said 2 sets of switch group, i.e. from 6-switch circuit, are connected with 3 electric wires to coupling parts a, b and c respectively, while the coupling part c and the coupling part a are changed over each other with the operation of a switching element such as a change-over relay RY having a control terminal 4 installed on the car body side. The above makes it possible to apply instruction signals from the switching part 1 to the controlling part 2 same in circuitry as that shown in FIG. 1.

Namely, the relay RY is set to ON or OFF according to levels at its control terminal 4 and combinations of high or low level at the control signal input terminal 3 with the levels at the control output terminals A and B in the operation same as that described on FIG. 1, whereby making it possible to give control instructions same in number as switches through three coupling parts a, b and c to the car body side according to the operational conditions, ON and OFF, of six switches, $SW_1$, $SW_2$, $SW_3$, $SW_4$, $SW_5$ and $SW_6$.

And further, description is made hereinafter on the embodiment shown in FIG. 3 in which same parts as those shown in FIG. 1 are expressed by using the corresponding same numbers and symbols.

The switching part 1 is quite the same as that shown in FIG. 1. In the controlling part 2, however, a 4-terminal bridge circuit is made up with the four sides of each transistor, $TR_3$, $TR_4$, $Tr_5$ and $TR_6$, by connecting a series circuit of the transistors $TR_3$ and $Tr_4$ and another series circuit of the transistors $TR_5$ and $TR_6$ to a power supply E in parallel through a current limiting resistance of load resistance $R_7$ on the side of an earthing side. Namely, in the bridge circuit there are two pairs of diagonal points, one pair being F on the power supply side and the other pair being G consisting of a connecting point of the transistor $TR_3$ and the transistor $TR_4$ and another connecting point of the transistor $TR_5$ and the transistor $TR_6$. The diagonal point G on the transistor $TR_3$ side is connected with the coupling part a and the control output terminal A, while the diagonal point G on the transistor $TR_5$ side is connected with the coupling part b and the control output terminal B. And also, the bases of the transistor $TR_3$ and the transistor $TR_6$ constituting one of the diagonal sides of the bridge circuit are connected respectively through resistances $\gamma_2$ and $\gamma_8$ to be controlled input terminal 3, while the bases of the transistor $TR_5$ and the transistor $TR_4$ constituting the other of diagonal sides of the bridge circuit are connected respectively through resistances $\gamma_6$ and $\gamma_7$ and the inverter I to the control signal input terminal 3. The resistances $\gamma_1$, $\gamma_2$, $\gamma_3$ and $\gamma_7$ connecting respectively between the bases of each transistor $TR_3$, $TR_4$, $TR_5$ and $TR_6$ and emitters are bias resistances.

Description is now made hereinafter on the operation of the circuitry described above. When the level at the control signal input terminal 3 is of 1, the transistors $TR_3$ and $TR_6$ are set to OFF, while the transistors $TR_5$ and $TR_4$ are set to ON. Even when the level at the control signal input terminal 3 is of 0, the transistors $TR_3$ and $TR_6$ are set to ON, while the transistors $TR_5$ and $TR_4$ are set to OFF. Thus, the object of this invention can be attained by the same operation as that described on the embodiment with reference to FIG. 1.

The embodiment shown in FIG. 4 being constructed by applying the method of the embodiment shown in FIG. 2 to the embodiment shown in FIG. 3, the operation is the same as those described with reference to FIG. 2 and FIG. 3. In FIG. 4 the same parts as those in FIG. 2 are shown with the corresponding same numbers and symbols, so that the description is omitted.

As described above, the embodiments according to this invention is so constructed as to make it possible to connect between the movable parts and the fixed parts through the coupling parts smaller in number than the switches and the component parts to be controlled through the cooperative operation of the switching part installed on the steering wheel side and the controlling part installed on the car body side. Accordingly, the embodiments according to this invention have small number of electric wires connecting between the steering wheel and the car body and are simple in construction of connection whether cable connection is made or contact connection is made. Thus, this invention has advantages of no or little disorder, easier checking of circuits, excellent durability, non-prevension of steering wheel operation, etc.

What is claimed as new and desired to be secured by Letters Patent of the United States is:

1. A steering wheel switching circuit comprising:
   a switching portion having three circuits connected in parallel across two terminals with a first one of said three circuits being a switch contact circuit, a second one of said three circuits being a series circuit including a first diode and a second switch contact circuit, and a third of said three circuits being a second series circuit including a second diode connected in a direction opposite the connection of said first diode and said second switch contact circuit; and
   a controlling portion having a power supply and two series circuit with each series circuit including a switching element, a control terminal, and a load resistance which load resistance is connected to the ground of said power supply and whereby said two series circuits are connected in parallel with said power supply with said controlling portion further including two control output terminals connected across two connecting points with each of said connecting points connecting one of said switching elements and one of said load resistances whereby a control signal applying means applies a control signal to the control terminal of said switching element of one of said two series circuits, and whereby, a means for inverting said control signals applies an inverted control signal to the control terminal of the switching element of the other of said two series circuits, and whereby said switching part is adapted to be fixed on a suitable position of a steering wheel, and two terminals of said switching portion are connected through coupling means to the control output terminals of said controlling portion which are adapted to be fixed on a car body, so that a plurality of component parts to be controlled which are installed on said car body can be controlled by outputs of said control output terminals with a combination of switching-on-and-off of switches in each said switch contact circuit of said switching circuit with variations of high and low levels of said control signals.

2. The steering wheel circuit according to claim 1, further comprising an additional two series circuits having two switching elements, control terminals connected in parallel and through said load resistances with said power supply in order to form a bridge circuit in said controlling portion with said control output terminals being connected with respective connecting points of said two series and said additional two series of switching elements, and whereby two connecting points are provided by connecting respective control terminals of said switching elements facing each other in said bridge circuit in order to produce control signals which are applied to two of said connecting points and whereby said control signals are inverted to the other two of said connecting points.

3. The steering wheel circuit according to claims 1 or 2, wherein a plurality of sets of said switching portion are adapted to be fit on suitable positions of a steering wheel, and said two terminals of each of said plurality of sets of switching portions are connected to said control output terminals by controlling a switching element adapted to be installed on a car body.

* * * * *